Jan. 9, 1962  R. BECKADOLPH  3,016,320
METHOD OF MAKING PNEUMATIC TIRES
Filed July 1, 1957
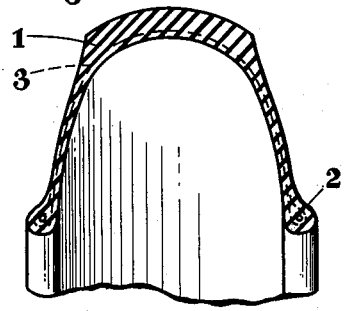
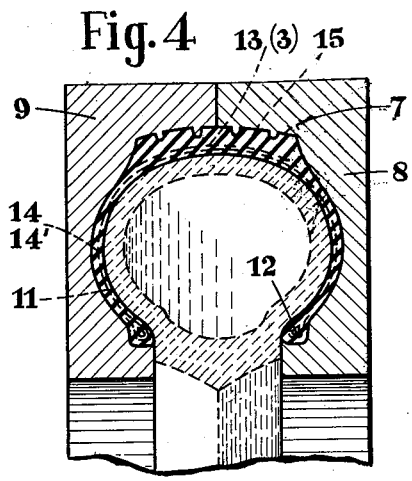
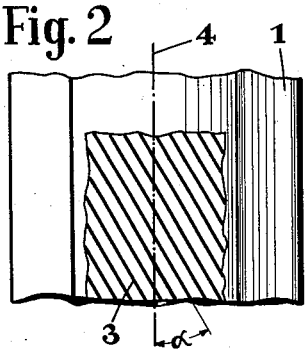
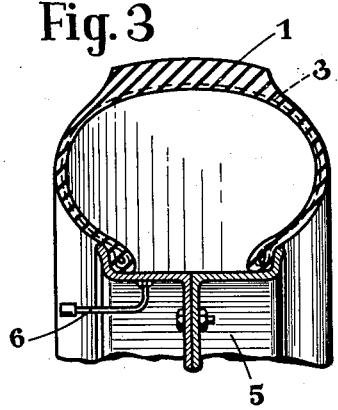
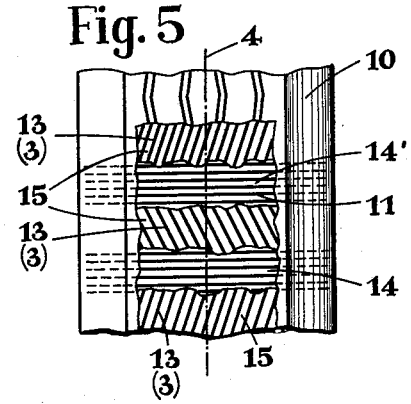

United States Patent Office 3,016,320
Patented Jan. 9, 1962

3,016,320
METHOD OF MAKING PNEUMATIC TIRES
Richard Beckadolph, Hannover, Germany, assignor to Continental Gummi-Werke Aktiengesellschaft, Hannover, Germany
Filed July 1, 1957, Ser. No. 668,952
Claims priority, application Germany July 2, 1956
2 Claims. (Cl. 156—123)

The present invention relates to a method of making pneumatic tires with two or more inserts of parallel reinforcing strand elements. More specifically, the invention concerns a method of a type set forth in the preceding sentence, according to which a mold is employed, while at least one of the inserts comprises threads, wires, bands or the like, anchored in the bead cores while the remaining insert or inserts is or are not anchored and is or are preferably located in the zenith portion of the tire, the non-anchored threads or the like crossing the anchored threads or the like.

The life of a vehicle tire, especially the dynamic endurance strength and stability of the inserts forming the carcass is greatest when foreign stresses are kept away from the pull-resistant threads or the like customary in tires and when such threads or the like during the driving operation are subjected to pulling stresses only. To this end, it is necessary when designing a tire to pay proper attention to the tire cross section and to select the tire cross section in conformity with the angular location of the threads or the like. It will be obvious that inserts with threads located in radial planes only will be subjected to a most favorable stress if the said inserts are located along a circle or on a portion of the circle, and if the tire in its vulcanizing mold will obtain a corresponding shape. If the threads form small angles with the circumferential direction of the tire, for instance angles of 20°, a cross sectional shape will be favorable in which the threads are arranged approximately along the circumferential line of an ellipse or a portion of said circumferential line, which means that the height of the tire body is essentially less than its width. Thus, each angular position of the threads has, so to speak, a specific cross sectional shape associated therewith.

It is an object of the present invention to ascertain the cross sectional shape of tires which are provided with reinforcing strand elements extending not only in substantially one and the same direction but also of tires having two or more layers of such elements or threads crossing each other, with one portion of said elements or threads being anchored in the cores of the tire, i.e. extending from bead to bead. First it had necessarily to be assumed that only those inserts which extend from bead to bead would be decisive for the ascertainment of the cross sectional shape of the tire. Surprisingly, this assumption proved wrong. It has rather been found, according to the present invention, that the dynamic endurance stability is highest when the tire cross sectional shape is selected with regard to the inserts which form the smaller angle with the circumferential tire line, regardless of whether the respective reinforcing strand elements are anchored on the beads or are not anchored thereon. It has been found, according to the present invention, that when the tire cross sectional shape differs from the specific cross sectional shape, the drop in the dynamic endurance stability of the carcass formed by the inserts will be all the higher the further the angle formed by the threads with the circumferential tire line will approach the value zero. This finding is particularly true for such vehicle tires in which the inserts extending from bead to bead, and in which the other inserts not anchored at the beads are arranged in approximately superimposed layers and, for instance, the non-anchored threads or the like are arranged between the layers formed by the anchored threads or the like. With such tires, and above all, with tires in which the non-anchored reinforcing strand elements form the smaller angle with the circumferential tire line, the invention is of great importance because the anchored and non-anchored inserts functionally supplement each other to form a highly satisfactory belted tire, while already minor deviations from the specific cross sectional form will produce a considerable reduction in the dynamic endurance stability.

Disregarding tires with threads located in radial planes, the ascertainment of the specific cross sectional shape of the tire is problematic because a tire represents a body which can only under great difficulties be mathematically analyzed as to its shape and resistance in its individual parts.

It is, therefore, a further object of the present invention to provide a method for quickly and with great assurance ascertaining the specific cross sectional shape of a tire.

These and other objects and advantages of the invention will appear more clearly in connection with the accompanying drawing, in which:

FIG. 1 represents a radial partial section through an unfinished tire.

FIG. 2 represents a portion of a top view of the tire shown in FIG. 1.

FIG. 3 is a device for ascertaining the tire cross section.

FIG. 4 is a radial partial section through a vulcanizing mold for pneumatic tires.

FIG. 5 is a top view of a vehicle tire vulcanized in the mold of FIG. 4.

The invention consists primarily in that the tire is given a cross sectional shape which is dependent on those threads or the like reinforcing inserts which form the smaller angle with the circumferential direction of the tire.

More specifically, according to the method of the present invention, the unvulcanized or unfinished tire, in other words the carcass surrounded by a still plastic mass is subjected to a filling pressure, and the cross sectional shape obtained thereby is ascertained. This method may be carried out for instance by means of the customary rims, if desired with the aid of a hose-like inflating body. The unfinished tire is placed on a corresponding rim, and air under pressure is introduced into the hollow space of the tire. As a result thereof, the unfinished tire deforms itself and adopts such a cross sectional shape that the reinforcements surrounded by the plastic mass are exclusively or almost exclusively subjected to pulling stress.

The method according to the invention will now be explained further in connection with the drawings. For purposes of ascertaining the specific cross section of the tire, first an unfinished auxiliary tire 1 is produced. The reinforcing element inserts 3 which are parallel to each other and are embedded in the enveloping layers in the unfinished auxiliary tire 1, which layers are still in plastic condition, are all embedded in said enveloping layers in such a way that they form an angle α with the circumferential direction 4 of the tire. If a plurality of layers with intercrossing inserts 3 are employed, the said inserts will also form the opposite angle with the circumferential direction 4 of the tire.

According to FIG. 3, the unfinished auxiliary tire 1 is mounted on a rim or wheel-like ring member 5 which is preferably composed of two or more parts, whereupon the interior of said tire is inflated and subjected to an inner pressure through fluid conveyed into the tire through the conduit 6. As a result thereof, the unfinished auxiliary tire 1 which is able to deform itself without additional force will assume a cross section which will depend on the angular position of its reinforcements. During this inflation, the reinforcements 3 will exclusively or almost exclusively be subjected to a pulling stress.

The thus ascertained cross sectional form serves for determining the cross section of the chamber 7 of the vulcanizing mold or form which latter is composed in customary manner of an upper portion 8 and a lower portion 9 (see FIG. 4) and serves as mold for the manufacture of such commercial tires in which the reinforcing inserts which are not anchored to the beads form substantially the same angle with the circumferential direction of the tire as did the corresponding reinforcing inserts with said auxiliary tire.

The ascertainment of the tire cross section is effected without considering the remaining inserts 11 located within the finished vulcanized tire 10 and anchored to the tire cores 12. Decisive for the selection of the cross section is the position of the reinforcements 13 which likewise form the angle α with the circumferential tire line 4.

The method according to the invention is particularly advantageous in connection with the tire shown in FIG. 5 with one or a plurality of layers 14 and 14' the reinforcements 11 of which extend either radially or substantially radially with regard to the tire thereby forming angles of approximately 60 to 90° with the circumferential tire line. Below the layer 14 and above the layer 14' as well as between the said two layers 14 and 14' there are respectively arranged layers 15 with reinforcements 13 which are located in the zenith portion of the tire. For instance, the layers 15 extend substantially over the width of the tread and form an angle of 18 to 36° with the circumferential tire line.

The layers 14 and 15 are closely superimposed, and their reinforcements are in customary manner arranged in cord position.

The invention is also advantageous in connection with such pneumatic vehicle tires which have exclusively one layer 14 with a layer 15 immediately adjacent thereto and located above and below the same. In other words the invention is also advantageous with such pneumatic tires in which one layer 15 and one layer 14 adjacent thereto (FIG. 5) have been omitted.

With the embodiment according to FIG. 5 and also with the above mentioned tires having one layer 14 only, the reinforcements 13 of the layers 15 may be arranged parallel to each other, i.e. extend substantially in one and the same direction. However, it is also possible to select the direction of the threads 13 so that the threads of adjacent layers cross each other as has been shown in FIG. 5.

It is, of course, to be understood that the present invention is, by no means, limited to the particular method, tire molds and tire shapes shown in the drawing but also comprises any modifications within the scope of the appended claims.

What I claim is:

1. A method of making pneumatic vehicle tires to be provided with beads and with first reinforcements anchored on said beads and located in at least substantially radial planes and also to be provided with second reinforcements crossing said first reinforcements and arranged in the zenith portion of the tire, which comprises: building up an unvulcanized tire provided with said second reinforcements only, inflating said unvulcanized tire to a filling pressure, permitting said unvulcanized tire while under pressure to freely adopt a resultant shape subject to the pulling stress on said second reinforcements, and vulcanizing pneumatic vehicle tires provided with said first and second reinforcements in a vulcanizing form having a correspondingly determined contour.

2. A method of making pneumatic vehicle tires to be provided with beads and with first reinforcements anchored on said beads and located in at least substantially radial planes and also to be provided with second reinforcements crossing said first reinforcements and arranged in the zenith portion of the tire, which comprises the steps of: building up an unvulcanized auxiliary tire with said second reinforcements only, mounting said auxiliary tire on a rim, inflating the thus built up tire on said rim, permitting said auxiliary tire while under pressure to adopt a resultant shape, determining therefrom the corresponding contour of a vulcanizing mold, building up the tire to be produced with said first and second reinforcements therein, and vulcanizing said last mentioned tire in a mold having a contour corresponding to that of said inflated auxiliary tire.

References Cited in the file of this patent

UNITED STATES PATENTS

| | | |
|---|---|---|
| 2,476,884 | Maynard | July 19, 1949 |
| 2,488,862 | Haller et al. | Nov. 22, 1949 |
| 2,614,056 | Kraft | Oct. 14, 1952 |
| 2,625,980 | Castricum | Jan. 20, 1953 |
| 2,625,981 | Wallace | Jan. 20, 1953 |
| 2,884,044 | Hulswit et al. | Apr. 28, 1959 |